United States Patent

Fessel et al.

[11] Patent Number: 6,135,325
[45] Date of Patent: Oct. 24, 2000

[54] LIQUID DISPENSER, SUPPLYING AND DOSING CYLINDER DEVICE, IN PARTICULAR FOR LIQUID DISPENSER AND METHOD FOR MANUFACTURING A LIQUID DISPENSER

[75] Inventors: Theodor Fessel, Ansbach; Siegfried Graf, Wertheim; Hans Graf, Kreuzwertheim, all of Germany

[73] Assignee: Poulten & Graf GmbH, Wertheim/Main, Germany

[21] Appl. No.: 08/881,157

[22] Filed: Jun. 24, 1997

[30] Foreign Application Priority Data

| Jun. 24, 1996 | [DE] | Germany | 196 25 243 |
| Apr. 15, 1997 | [DE] | Germany | 197 15 709 |
| Jun. 6, 1997 | [DE] | Germany | 197 23 947 |
| Jun. 9, 1997 | [DE] | Germany | 197 24 261 |

[51] Int. Cl.$^7$ ............................. G01F 11/02; B05B 11/00
[52] U.S. Cl. ................ 222/309; 222/383.1; 422/100
[58] Field of Search ................... 222/155, 157, 222/158, 159, 309, 383.1; 422/100

[56] References Cited

U.S. PATENT DOCUMENTS

| 3,940,027 | 2/1976 | Marterer . | |
| 3,991,914 | 11/1976 | Kotuby et al. . | |
| 4,003,499 | 1/1977 | Shapiro et al. | 222/383.1 X |
| 4,225,063 | 9/1980 | Ayres . | |
| 4,306,670 | 12/1981 | Oshikubo | 222/309 |
| 4,307,137 | 12/1981 | Ota et al. . | |
| 4,815,663 | 3/1989 | Tada . | |
| 4,995,532 | 2/1991 | Knodel | 222/309 X |
| 5,141,137 | 8/1992 | Knödel . | |
| 5,284,132 | 2/1994 | Geier . | |
| 5,624,059 | 4/1997 | Lo | 222/309 |

FOREIGN PATENT DOCUMENTS

| 0 086 912 | 8/1983 | European Pat. Off. . |
| 757045 | 8/1951 | Germany . |
| 35 34 550 | 10/1986 | Germany . |
| 0 542 241 | 5/1993 | Germany . |
| 41 37 351 C2 | 5/1993 | Germany . |
| 43 34 750 C2 | 8/1995 | Germany . |
| 63-122509 | 5/1988 | Japan . |

Primary Examiner—Kevin Shaver
Attorney, Agent, or Firm—Laubscher & Laubscher

[57] ABSTRACT

A liquid dispenser includes a valve block that can be attached onto a vessel or can be connected to a reservoir. The valve block is characterized by an intake valve, a supply and dosing cylinder in which a supply and dosing plunger is slidably accommodated, and an outlet device for the liquid. The valve block and the supply and dosing cylinder preferably form an integral unit.

18 Claims, 9 Drawing Sheets

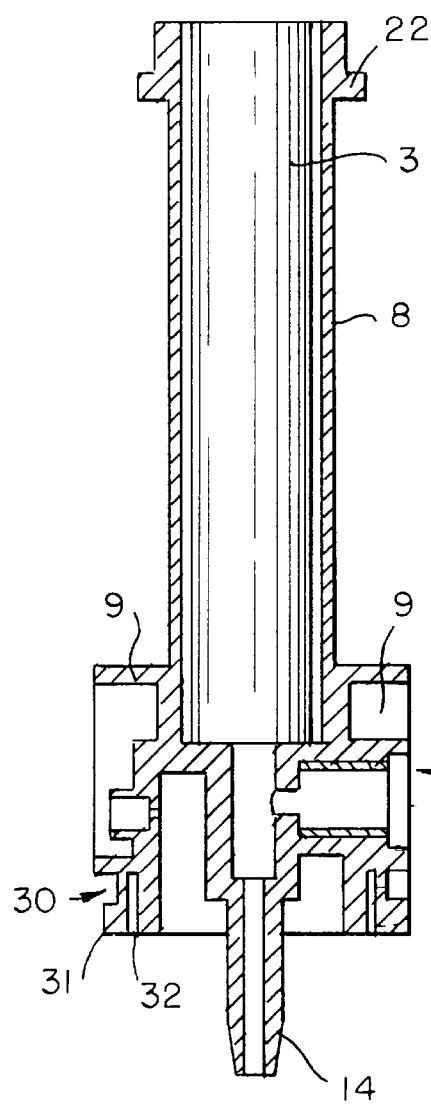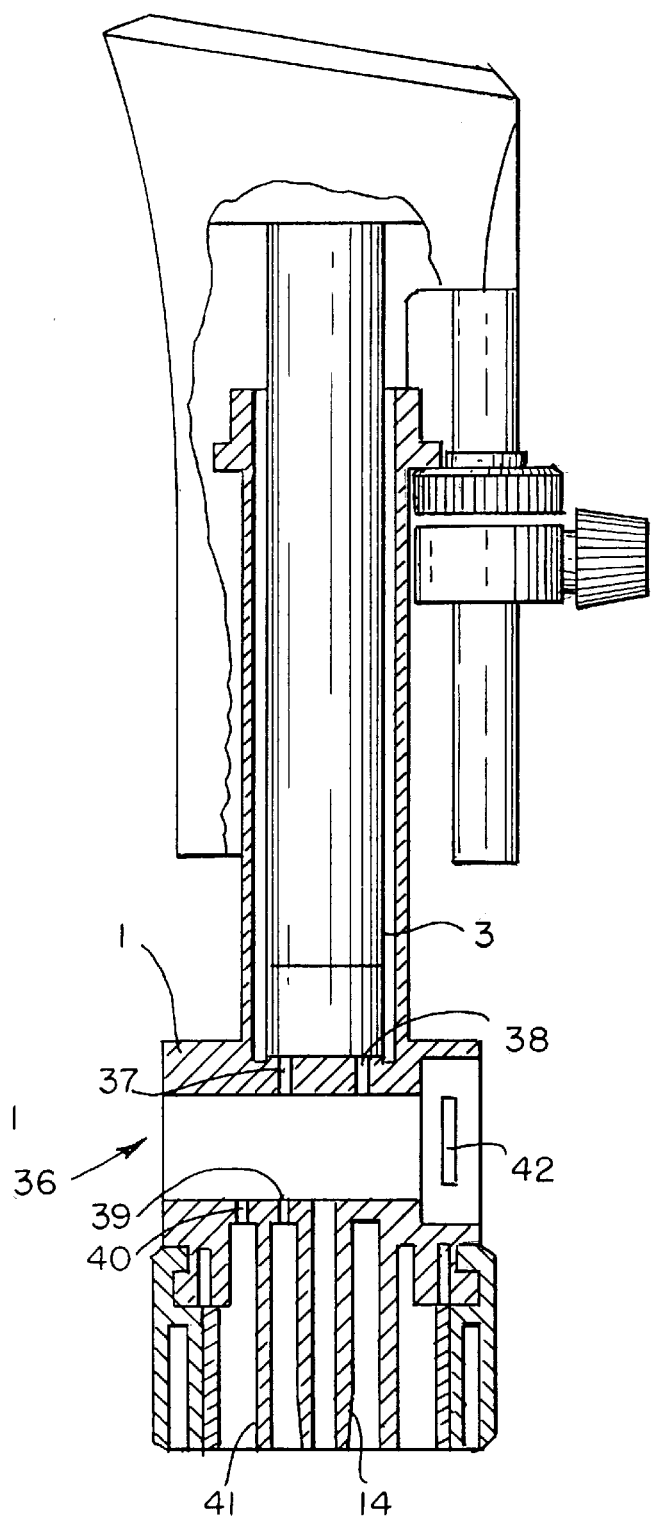
FIG. 3
FIG. 4

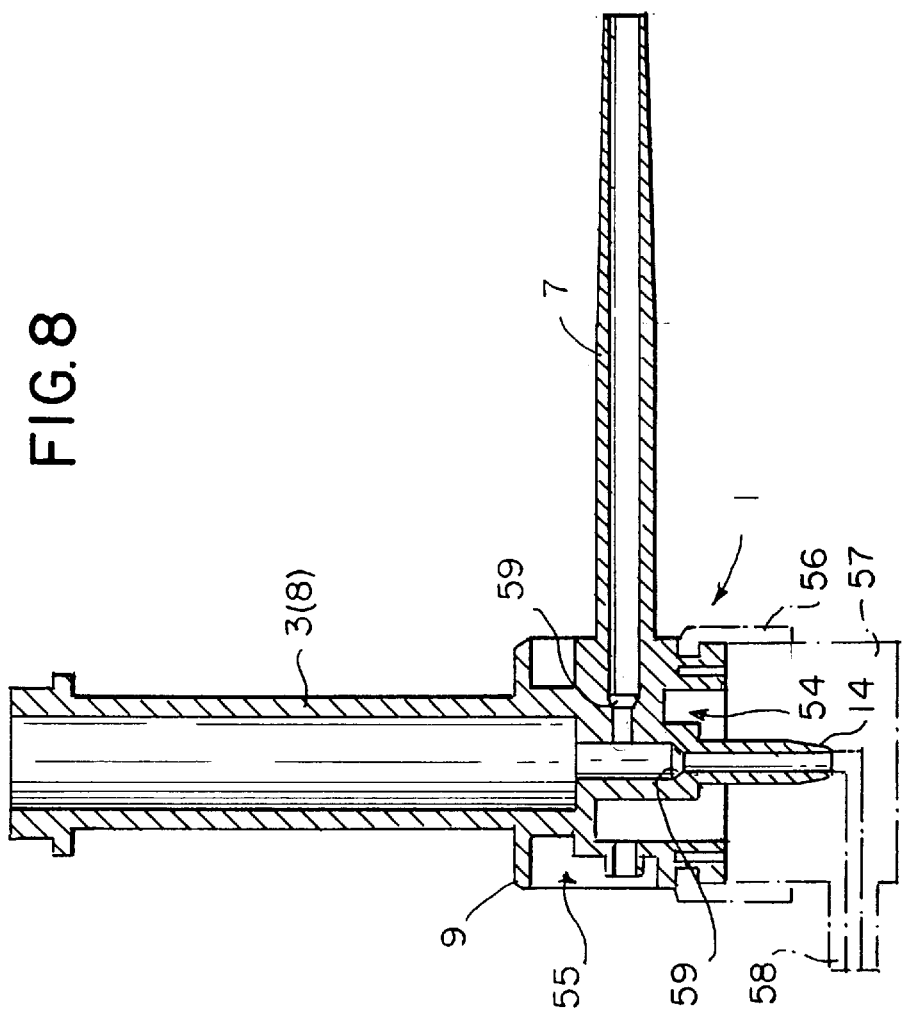
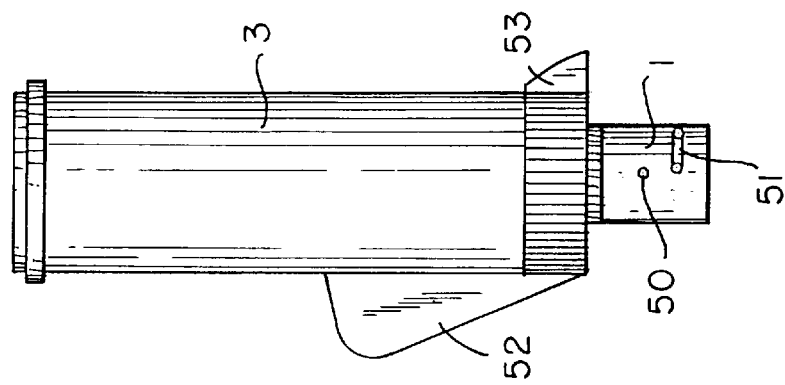

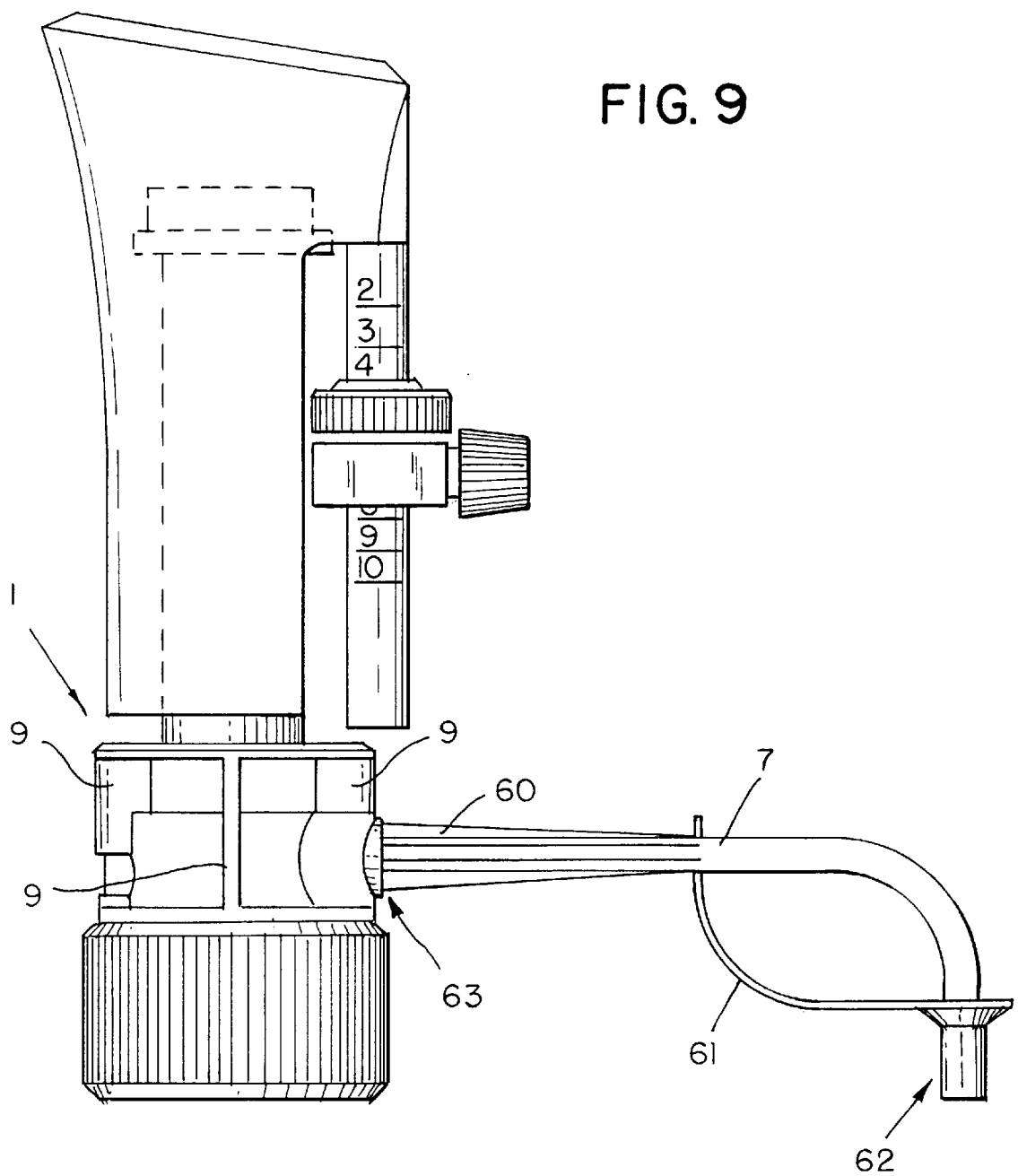

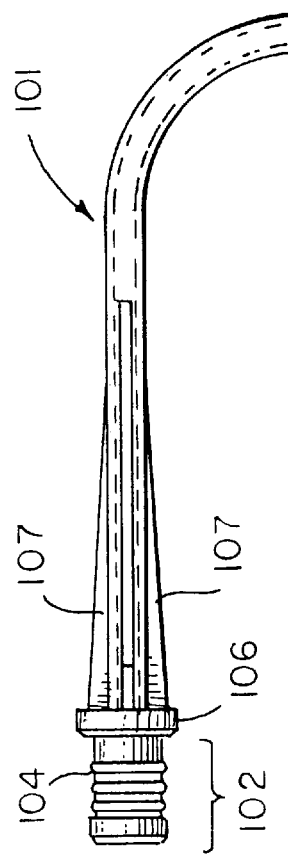
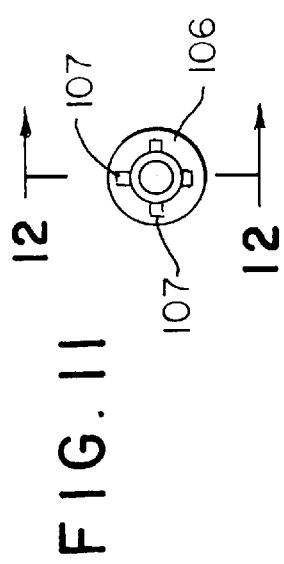
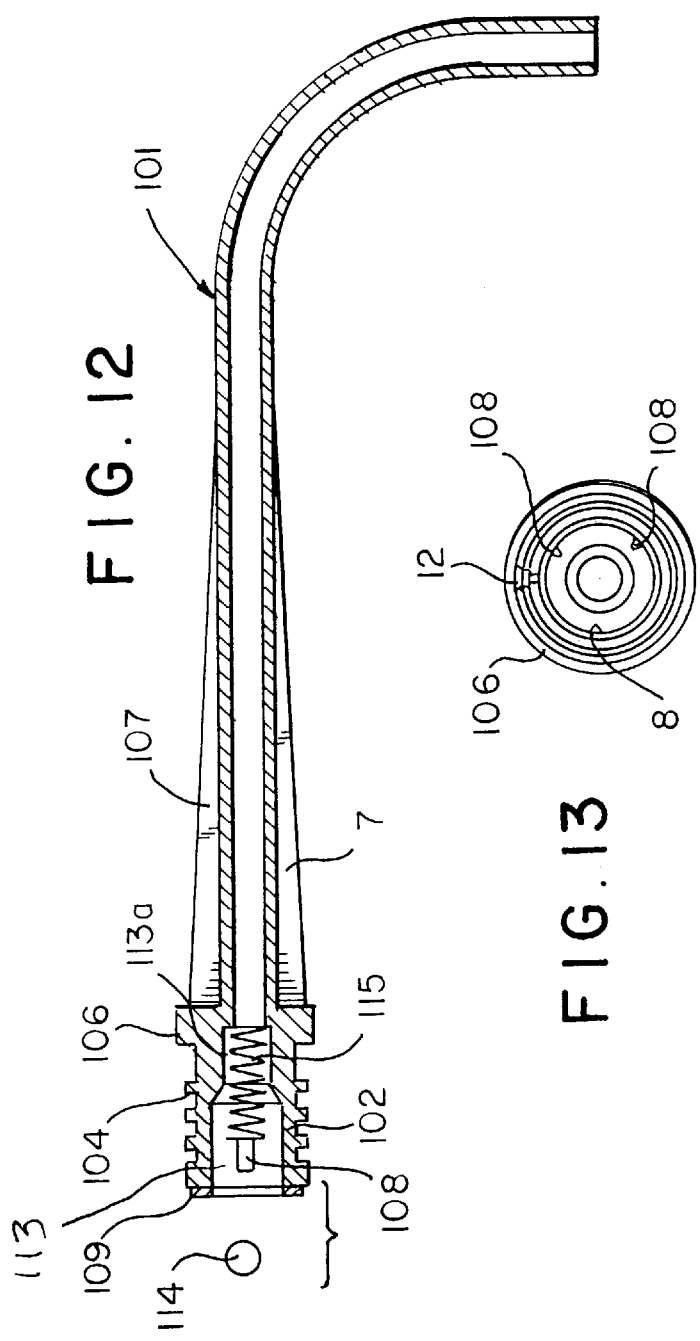

LIQUID DISPENSER, SUPPLYING AND DOSING CYLINDER DEVICE, IN PARTICULAR FOR LIQUID DISPENSER AND METHOD FOR MANUFACTURING A LIQUID DISPENSER

BACKGROUND OF THE INVENTION

The present invention relates to a liquid dispenser having a valve block connected with a vessel, the valve block having an intake valve, a supply and dosing cylinder connected to the valve block, and a plunger connected with an operating device slidably accommodated within the supplying and dosing cylinder. A discharge device for the liquid is connected with the valve block. The invention further refers to a supply and dosing device comprising a supply and dosing cylinder and a valve block.

BRIEF DESCRIPTION OF THE PRIOR ART

A liquid dispenser for dosing liquids from a reservoir is known from DE 43 34 750 CS. As disclosed therein, the reservoirs provided with an adjustment device through which the supply quantity to be output is precisely and progressively adjustable. The stroke length of a supply plunger slidably received in a supply and dosing cylinder is adjusted by the adjustment device. The supply and dosing cylinder is made of a glass material resistant to the medium to be supplied and is provided with a measuring scale in the area of its outer surface and with a plastic coating applied by a whirl sintering method to prevent broken glass from being released in case of possible damage of the supplying cylinder. Forming the whirl sintering coating on the supply and dosing cylinder requires a considerable amount of technical equipment. Since the thickness of the layer formed by the whirl sintering method is subject to variations, the supply and dosing cylinder is reworked in the area of its rear fitting surfaces. The manufacture and assembly of the supplying cylinder requires quite an amount of time and care. The coated supply cylinder is inserted into a valve block having an intake and an outlet valve into which an outlet or discharge tubule is screwed. A similar device is known from DE 41 37 351.

Therefore, the present invention was developed to improve on the liquid dispenser of the above-mentioned kind in a manner that the dispenser provides a precise supply and dosing of the liquid to be dispensed and has an uncomplicated and inexpensive design. It is possible with such a dispenser to severely reduce the manufacturing costs and assembly work of a liquid dispenser and to reliably ensure that the supply and dosing cylinder is captively connected to the valve block in a sealing and mechanically proper manner.

SUMMARY OF THE INVENTION

The high supply and dosing precision of the liquid dispenser is preferably ensured in that the supply and dosing cylinder is a glass cylinder, preferably a precision quartz glass cylinder. This provides the supply of sensitive or aggressive media in a reliable manner. Furthermore, a reliable seal between the supply plunger and the glass cylinder is ensured by the especially high surface quality of the inner wall of the glass cylinder. Moreover, a glass cylinder affords easy movement of the supply plunger. This plunger preferably is a glass plunger or a glass plunger provided at least partially with a PTFE coating forming one or a plurality of sealing lips. If necessary, it is also possible to make the supply and dosing cylinder of a ceramic material, in particular of a duroplastic material or of a thermoplastic material having a high melting point.

The valve block is preferably made of a synthetic plastic material resistant to chemicals, in particular of polypropylene. A valve block made of such a material has an especially high chemical durability. It is preferably set onto the vessel by an adapter (preferably also made of polypropylene) rotatably supported at the valve block.

The integral design of the valve block and supply cylinder is realized in that the glass cylinder is encompassed by a plastic protective tube integrally formed with the valve block, the tube being formed of plastic material resistant to chemicals, in particular polypropylene. The supply of dosing cylinder is thereby conventionally prevented from mechanical damage and glass splinters in case of glass breaking. The protective tube is connected to the outer wall of the supply cylinder in a fixedly adhering manner, i.e., as an inseparable composite body. In case of a damage of the glass cylinder, release of splinters from the protective tube is excluded and a surprisingly inexpensive manufacture is enabled by retaining all precision and resistance criteria. As an alternative, a ceramic cylinder or a plastic cylinder highly resistant to chemicals may also be used instead of the glass cylinder.

The glass cylinder is preferably injected into the valve block and the protective tube. Thus, the intimate material compound between the glass cylinder and the encompassing protective tube (which is integral with the valve block) is achieved by injection-molding the glass cylinder in a mold. This results in an especially reliable attachment of the cylinder within the protective tube and at the valve block. Moreover, an ideal seal between the glass cylinder and the valve block is attained.

An advantageous embodiment of the liquid dispenser if the protective tube and the valve block are formed integrally is provided in that the valve block is formed with a skeleton structure with spaced webs separated by recesses. The liquid dispenser according to the invention can be manufactured by such an embodiment of the valve block in an especially economic manner and with a high rigidity.

Considerable advantages will be achieved if the valve block is manufactured by a plastic injection molding process, since the wall thicknesses in the valve block are widely uniform. Moreover, the individual functional sections of the valve block can easily be formed in such a skeleton structure.

A further object of the invention is to provide a supply and dosing cylinder device, in particular for a liquid dispenser, which is simpler to manufacture and at the same time has a high and reliable dosing accuracy.

According to a preferred embodiment of the invention, the supply and dosing cylinder formed of a glass material or of a suitable ceramic material or of a duroplastic material, is completely encompassed in the region of its outer periphery with the plastic material of the plastic body. The injection-molding of the supply and dosing cylinder with a plastic material forming the plastic body leads to a stable embodiment of the supply and dosing cylinder. To improve the connection between the plastic body and the supply and dosing cylinder, it is possible in an advantageous manner to chemically treat the outer surface of the supply and dosing cylinder. It is also possible to slightly roughen the outer surface of the supply and dosing cylinder for example by sand blasting. Instead of using a supply and dosing cylinder made of a glass material or a ceramic material, it is also possible to make the supply and dosing cylinder of a different material, for example of a duroplastic material.

When using a supply and dosing cylinder of that kind, it turns out to be advantageous to create a bonding bridge by appropriately treating the outer surface of the supply and dosing cylinder, whereby an especially tight bond of the supply and dosing cylinder at the plastic body is provided.

According to a preferred embodiment of the invention, the plastic body is made of a transparent material. Thus, the filling level of the supply and dosing cylinder can be easily detected. The plastic body is made in an advantageous manner of polypropylene. The plastic body can also be made of translucent non-transparent material. In case the plastic body is made of a non-transparent material, it is possible to provide window portions at least in sections, made of a transparent plastic.

A further embodiment of the invention in order to reduce assembly work when creating the liquid dispenser is provided in that a valve block provided for receiving a valve is integrally formed with the plastic body, i.e., with the protective tube encompassing the glass cylinder. Additional assembly of the plastic body or the supply and dosing cylinder and the valve block is no longer necessary. Moreover, possible leakages in the area of such a joint can be avoided. For this purpose, the valve block and the plastic body are formed as an integral unit by a plastic injection molding process. For this purpose, thermoplastic material is injected into a form tool, which forms a sleeve through which the valve block and the plastic body are integrally formed. To create a high-quality dispenser, the supply and dosing cylinder consisting of a glass or ceramic material or if necessary of a duroplastic material can be inserted into this sleeve before closing the injection mold. A unit is then formed by injecting the plastic material, in which the supply or dosing cylinder is fixedly embedded.

The valve block is formed by a sleeve formed by an at least two-piece form tool, wherein the separating surface of the form tool extends substantially parallel to the longitudinal axis of the supply and dosing cylinder. The individual wall section of the valve block can thereby be formed with a relatively thin wall, which leads to severe material savings and to a shorter curing period.

It is a further object of the invention to provide a method of manufacturing a liquid dispenser or of manufacturing a supply/dosing cylinder valve block unit for a liquid dispenser, which can be easily manufactured at a constantly high utility value, in particular in view of a high dosing precision over long periods of time.

Therefore, a method is provided for manufacturing a liquid dispenser comprising a supply and dosing cylinder and a valve block in which the valve block is formed by injection molding in the interior of a sleeve of a plastic material, and which is removed from the sleeve after curing of the plastic material. In the course of the plastic injection molding process forming the valve block, a plastic body is integrally formed with the valve block for receiving a supply cylinder. It is thereby possible to provide a cylinder/valve block unit by means of which the total assembly work is severely reduced when manufacturing a liquid dispenser.

According to a preferred embodiment of the method, an inset cylinder inserted into a form tool forming the supply and dosing cylinder is coated by a plastic material forming a plastic body. The cylinder is centered in an advantageous manner by a forming core. To avoid excessive thermal loads of the cylinder when contacting the hot plastic injected into the sleeve, the cylinder is preheated before contacting the plastic material. According to a preferred embodiment of the method, the cylinder is set onto the forming core with a tight fit to prevent plastic material provided for forming the plastic body from penetrating a gap portion formed between the glass cylinder and the forming core.

The front end of the cylinder is coated by the plastic material. The edges formed in the end portions of the cylinder are thereby covered in an inexpensive way, so that there is no risk of getting hurt. Moreover, it is possible to provide a small conical extension in this end portion, which facilitates inserting a supply and dosing plunger into the cylinder.

The plastic material is injected into the sleeve at different locations. This leads to an especially favorable flowing direction of the plastic material in the region of the supply and dosing cylinder. On the other hand, the majority of the plastic material can be filled into the sleeve so that this plastic material does not contact the supply and dosing cylinder.

Different plastic material can be injected into the sleeve at different locations. According to a preferred embodiment of the method, a transparent or translucent plastic material, preferably polypropylene, is injected into the area of the sleeve provided for receiving the supply and dosing cylinder, and a dyed plastic material is injected into the sleeve provided for forming the valve block. It is also possible to inject an opaque plastic material into the supply and dosing cylinder and into the sleeve provided for forming the valve block, the opaque plastic material having desired mechanical properties. The chronological course of the injection process of the respective plastic material is defined by a time table to ensure that the supply and dosing cylinder is exclusively encompassed by a transparent plastic material.

BRIEF DESCRIPTION OF THE FIGURES

Other objects and advantages of the invention will now be described with reference to the accompanying drawings, in which:

FIG. 3 is a longitudinal section through an integral unit consisting of the valve block and supply and dosing cylinder;

FIG. 4 is a view of an alternative embodiment of a liquid dispenser in the longitudinal section;

FIG. 7 is a further embodiment of a supply and dosing cylinder with a valve block integrally formed therewith;

FIG. 8 is a further embodiment of a valve block made in a skeleton structure with an integrally formed supply and dosing cylinder as well as an ejector conduit;

FIG. 9 is a further embodiment of a supply and dosing device having a valve block formed in a skeleton structure, and a preferred embodiment of the ejector conduit;

FIG. 10 is a discharge tube in lateral view;

FIG. 11 is a discharge tube in lateral view (from the right according to FIG. 1), wherein the bent end is cut off;

FIG. 12 is an enlarged longitudinal section according to section A-B in FIG. 2 including the bent end section;

FIG. 13 is an enlarged axial view of the end section of the discharge tube conduit according to FIG. 3;

DETAILED DESCRIPTION

Figure 1:
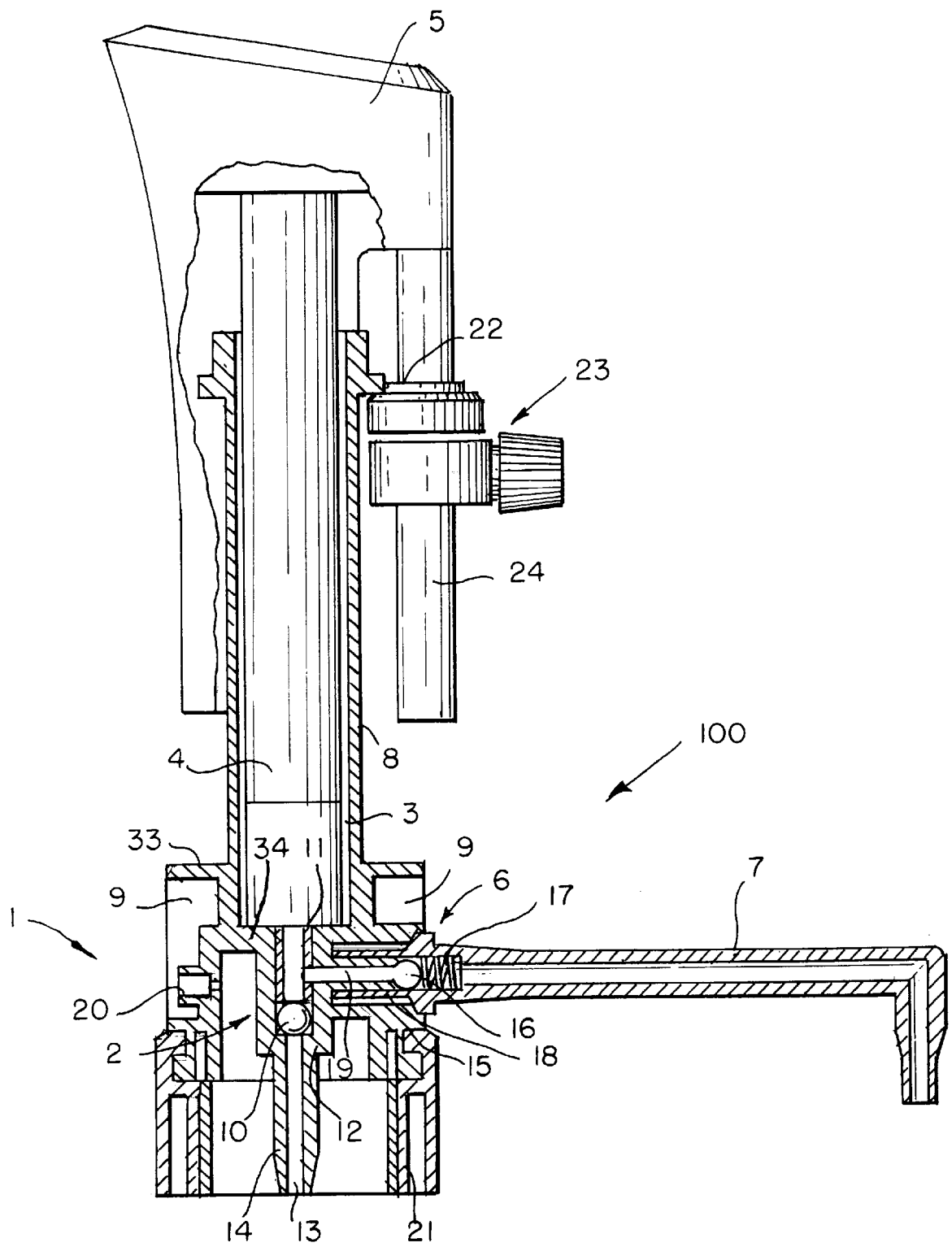
FIG. 1 is the longitudinal section of the liquid dispenser according to the invention.

The liquid dispenser 100 shown in FIG. 1 comprises a valve block 1 that can be set onto a vessel or installed into a laboratory pump, with a valve 1 provided in the interior of the valve block. An inner space formed in the supply and dosing cylinder 3 communicates through this valve 2 with the vessel or container (for example a canister), which is not shown. A supply and dosing plunger 4 is accommodated in the supply and dosing cylinder 3, the supply and dosing plunger being slidably reciprocated by a handle 5. A liquid sucked in from the vessel or container and conveyed through the supply and dosing cylinder 3 and the supply plunger 4, e.g., a diluted solution, is supplied via the outlet to a discharge tube 7. The valve block 1 and the supply and dosing cylinder 3 form an integral unit.

The valve block 1 of the embodiment that is shown is formed of a plastic material, in particular of polypropylene. The supply and dosing cylinder 3 is encompassed by a protective tube 8 integrally formed with the valve block 1. In the embodiment shown, the supply and dosing cylinder 3 is formed as a glass cylinder and is injected into the valve block 1 and the protective tube 8 in the course of a plastic injection molding process. The glass cylinder 3 has a thickness (wall thickness) of for example 1 mm, whereas the surrounding protective tube 8 has a wall thickness of for example 2.5 mm. The wall thickness of the glass cylinder 4 is preferably at least 10% of the wall thickness of the protective tube 8 which is made of synthetic plastic material. The protective tube 8 is made of a transparent or translucent plastic material, so that the filling level of the supply and dosing chamber formed in the supply and dosing cylinder 3 can be visually monitored. The supply and dosing cylinder 3 is held in the protective tube 8 and the valve block 1. The supply plunger 4 is preferably a glass plunger or a glass plunger at least partially encompassed by PTFE, wherein this PTFE coating comprises at least a sealing lip.

The valve block 1 has a skeleton structure and comprises a number of webs or flutes 9, which define exposed recesses toward the outer side of the valve block 1. The webs or flutes 9 that are shown are arranged in a manner that the outer portion of the valve block does not form undercut portions in a two-piece form tool.

The valve accommodated in the valve block 1 comprises a suction closing valve including a suction valve ball 10 that can be loaded with a spring (not shown) and a spacer sleeve 11 defining the stroke movement of this valve ball 10. A valve seat 12 of the valve 2 is established by a circumferential edge formed at the valve block 1. This circumferential edge is formed in the opening portion of an intake duct 13, which extends coaxially to the longitudinal axis of the supplying cylinder 3. The intake duct 13 extends in the interior of a hose pin 14, which is also integrally formed with the valve block 1.

The foot section of the discharge tube 7 is provided with a screw base 15 or with a coaxial sealing blade base (see FIG. 10) and screwed by this base into the valve block 1 radially from the outside (FIG. 1) or it is captively pressed into the base (see FIGS. 10 to 16). The outlet 6 preferably comprises a ball valve with an outlet valve ball 16 loaded by a spring 17. The outlet valve ball 16 is seated in closing position on a sleeve 18, made in this case of synthetic plastic material which is inserted into the valve block 1.

As an alternative, the valve seat can be attached without a sleeve directly at the valve block 1 or it can be formed by the same as shown in FIGS. 10 to 16. The sleeve 18, the outlet valve 16, and the spring 17, in case of the thread or press seat design, are provided coaxially to the longitudinal axis of the discharge tube 7 in the inner portion of the thread or press base 15. A passage channel 19 formed in the interior of the sleeve 18 is in fluid communication with the supply space formed in the supply and dosing cylinder 3. The sleeve 18 is also unnecessary. Such an embodiment is shown in FIGS. 10 to 16. In this embodiment, an end portion 102 of the discharge tube 107 forms an accommodating space 113 for the valve ball 114 which is preloaded by a pre-loading spring 115 against a circumferential edge in the valve block 103 as a valve seat 123 or in a separately pressed-in valve seat in the valve block.

A hose from a vessel is put onto the hose pin 14 before assembly of the liquid dispenser, the hose reaching down to the bottom of the vessel. In case of an upward movement of the supply and dosing plunger 4, a fluid in the vessel is sucked in by the valve means 2 through the hose. Due to the pressure build up in the interior of the supply and dosing cylinder 3, the outlet valve 16 is forced out of its closing position opposite to the force of the spring 17 to an open position and enables a discharge of the fluid from the supply and dosing space formed in the supply and dosing cylinder 3 through the discharge tube 7.

To permit a pressure compensation between the interior of the vessel and the surroundings when sucking in a fluid through the supply plunger 4, the valve block 1 is provided a ventilation bore 20 which is covered by a filter stopper consisting for example of a sintered granulate material. This filter stopper can be inserted into a preferably tapered insertion bore also provided at valve block 1. The valve block 1 is sealingly attached at the vessel by means of an adapter such as a swivel nut. Instead of suing a swivel nut 21 provided separately from the valve block, it is also possible to provide an appropriate threaded section which is formed integrally with the valve block 1.

A head section 22 integrally formed with the protective tube 8 is formed in the upper portion of the protective tube 8, the head section forming an abutment surface for a supply stroke adjustment device 23. The head section 22 extends up to the uppermost axial end of the supply and dosing cylinder 3 and, if necessary, it projects over the front end section of the supply and dosing cylinder in a manner that the circumferential edges of this end portion are still covered by the plastic material of the protective tube 8.

The handle 5 in the liquid dispenser is provided as a hollow body, and in a lowered position of the supply plunger the handle substantially fully covers the supply and dosing cylinder 3 or the protective tube 8 encompassing the same. According to a preferred embodiment, a scale rod 24 of the supply stroke adjustment means 23 is formed integrally with the handle 5.

The integral unit described before in connection with FIG. 1, which is formed by the valve block 1 and the supply and dosing cylinder 3, is formed by a form tool, the structural part of which is provided for forming the outer portion of the valve block 1, being movable in a direction extending substantially transversely to the longitudinal direction of the supply and dosing cylinder 3 in an opening or closing position. In the embodiment of a form tool shown in FIG. 2 according to the invention, the tool comprises a first structural part 25 and a second structural part 26. Both structural parts 25 and 26 are movable in a direction transversely to the longitudinal direction of the unit. A first core element and a second core element 29 are disposed in a mold cavity defined between the two structural parts 25, 26. The first core element 28 defines together with the first structural part 25 and the second structural part 26 a sleeve section in which the plastic body provided for receiving the supply cylinder is formed. Before closing the first and second structural parts 25, 26, the insert cylinder, shown in FIG. 1, can be put onto the first core element 28. After inserting the second core element 29, the first and second structural parts 25, 26 are put together and a synthetic plastic material, which is preferably polypropylene, is injected into the sleeve 37 that is now formed. This plastic material fills the entire sleeve 27 and thus forms an integral part of the liquid dispenser, which comprises the valve block 1 and the plastic body provided for receiving the supply cylinder 3 and preferably also the discharge tube 7. It is possible to manufacture different units in a simple manner, in particular regarding the stroke volume by replacing the first and second core elements 28 and 29, especially the first core element 28. Differing inner diameters of the supply and dosing cylinder 3 can be taken into account by an appropriate first core element 28.

The two first and second core elements 28 and 29 are centered by the first and second structural parts 25, 26. According to a preferred embodiment, the two core elements are also inserted into one another, in particular in an area provided for filling the intake channel 13 shown in FIG. 1. As an alternative to the embodiment of the form tool shown in FIG. 2, it is also possible to couple at least the second core element 29 with a drive mechanism to permit automatic demolding of the structural part formed in the mold cavity 27. The demolding movement of the first core element 28 may also be automated. An especially reliable first core element 28 with the supply and dosing cylinder is achieved in that the form tool is disposed in the injection mold in a manner that the valve block is disposed above the head section. In accordance with another embodiment of the invention, the longitudinal axis of the first core element 28 substantially extends vertically, wherein a section of the first core element 28 substantially extends vertically, wherein a section of the first core element 28 provided for forming the first valve 2 (FIG. 1) points upwardly. It is ensured that the supply and dosing cylinder 3 cannot slip off the first core element 28 due to its own weight. The injection of the plastic material into the mold cavity 27 is also carried out in accordance with a preferred embodiment of the invention in a manner that the supply and dosing cylinder 3 is not displaced in the first core element 28. To reduce the thermal load on the supply and dosing cylinder 3 when injecting the plastic material, the first core element 28 is preheated according to a preferred embodiment of the invention. The preheating of the first core element 28 can be carried out, in accordance with a preferred embodiment of the invention, by an electric heating device disposed in the interior of this core element 28.

Figure 2:
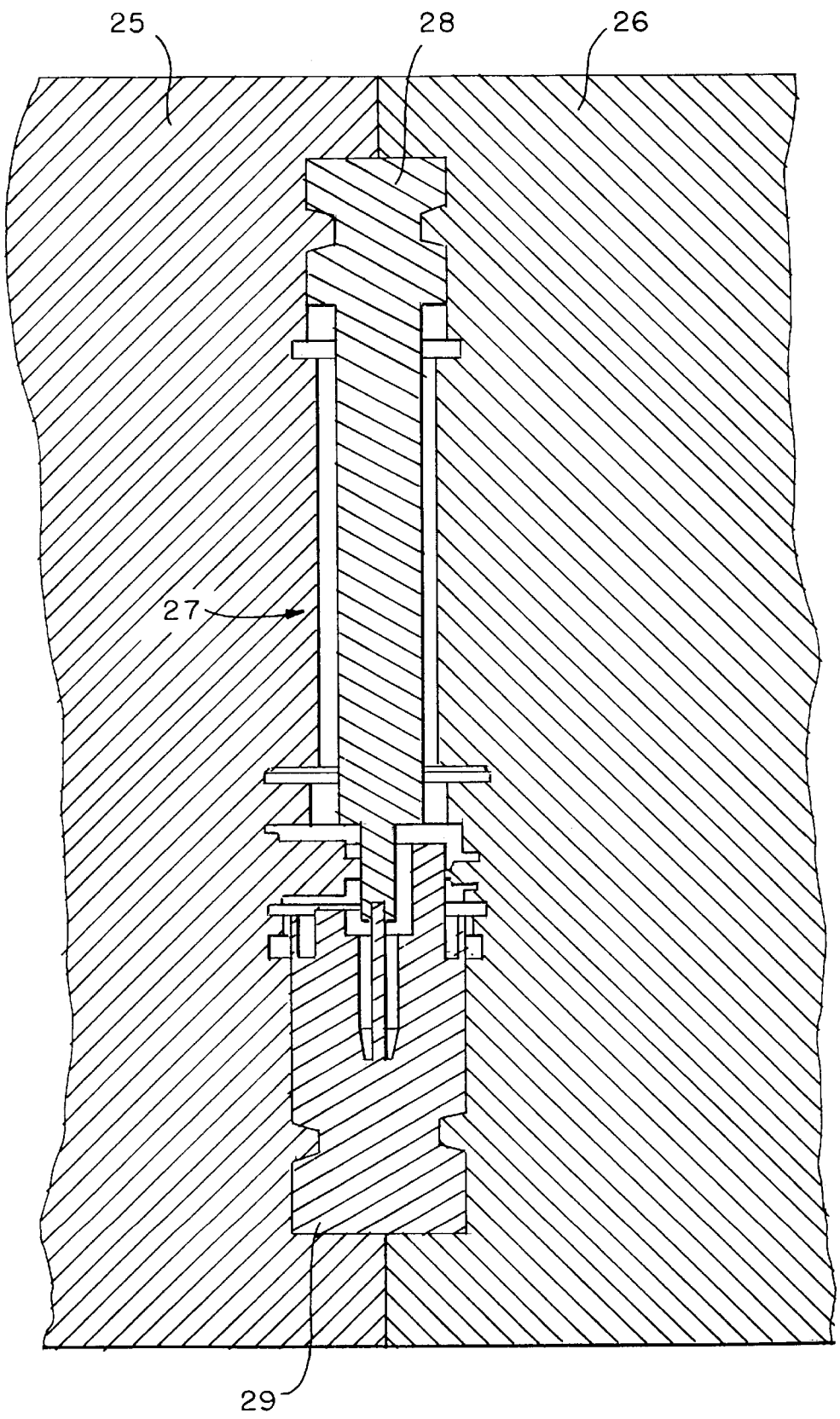
FIG. 2 is a simplified section through a form tool for forming the integral unit consisting of the valve block and the supply and dosing cylinder.

An integral unit for a liquid dispenser according to the invention which is produced by a form tool according to FIG. 2 is shown in FIG. 3. This integral unit comprises the valve block 1 provided for accommodating the valve 2, as well as a plastic body formed integrally with the valve block and defining the protective tube. The supply and dosing cylinder 3 provided for receiving the supply plunger 4 shown in FIG. 1 is embedded into this plastic body. The embedding of the supply and dosing cylinder 3 into the plastic body is carried out in a plastic injection molding process during which the valve body is formed together with the plastic body in an appropriate mold cavity. The head section 22 is formed at an end of the plastic body forming the protective tube, facing away from the valve body 1, the head section 22 forming an abutment surface which defines the stroke of the supply plunger 4 in combination with a stroke limiting device. The valve block 1 integrally formed with the plastic body for receiving the supply cylinder is formed as a skeleton structure with outwardly projecting webs or flutes 9. These webs or flutes 9 permit sufficient reinforcement if the valve body 1.

The integral member shown in FIG. 3 also has provided thereon the hose pin 14 which is formed integrally with the valve block and which has already been described in connection with FIG. 1. The surroundings of the hose pin 14 may, according to a preferred embodiment of the invention, be formed by the second core element 29 shown in FIG. 2. The integral member shown in FIG. 3 is preferably attached by a swivel nut (FIG. 1) at a vessel, a container, or a drive device. This swivel nut or other suitable fastener engages a circumferential groove 30 provided in the lower portion of the valve block 1. This circumferential groove is defined by an annular flange 31, which is resilient in the radial direction due to an annular groove 32 also formed in the valve block 1.

In the embodiment of the integral member shown in FIG. 3, the supply and dosing cylinder 3 is even with the head section 22. As an alternative, it is also possible to make the supply and dosing cylinder 3 shorter or to make the head section 22 longer. Furthermore, it is also possible to form all operational sections provided for the valve of the liquid dispenser, at an insertion element, which is inserted or screwed-in into a recess into the valve block extending in particular radial to the longitudinal axis of the supply cylinder 3.

According to a further embodiment, the discharge tube 7 is not screwed into the valve block 1 through a threaded base, but is pressed into the valve block 1 through a preferably cylindrical press seat (see FIGS. 10 to 16). Such an attachment of the discharge tube 7 at the valve block 1 is of special advantage in particular view of the capability of sterilization of the liquid dispenser, since a much smaller gap between the two components is established compared to a threaded connection. As an alternative to such a press-fit of the foot portion of the discharge tube 7 into the valve block 1, it is also possible to provide a shoulder similar to the pin hose 14 at the valve block, on which the discharge tube 7 may be attached. In order to ensure a reliable sterilization of the liquid dispenser, the discharge tube may also be drawn off the liquid dispenser.

Figure 5:
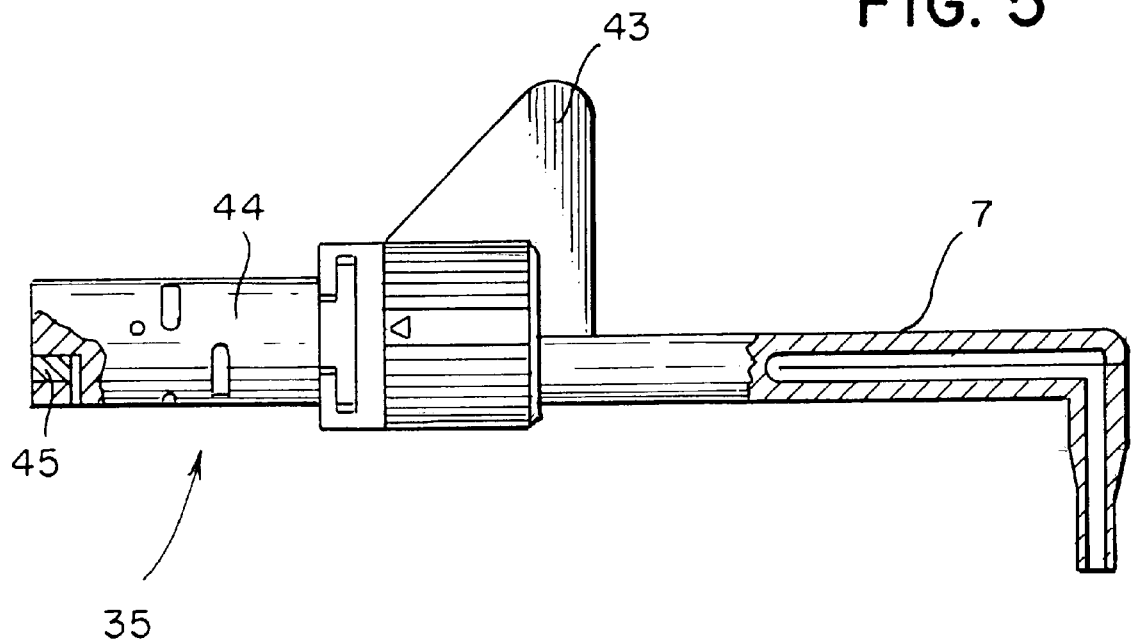
FIG. 5 is a view of a single part of a preferred embodiment of an outlet device provided in the liquid dispenser according to FIG. 4.

The embodiment of a liquid dispenser shown in FIG. 4 differs from the embodiment described before in combination with FIG. 1 by a switching mechanism accommodated in the valve block 1. This switching mechanism comprises a recess provided for accommodating a valve slide element 35 (FIG. 5). The recess is provided as a cylindrical through-bore and extends continuously from a front side of the valve block 1 to a rear side of the valve block. A number of passage ducts run into the circumferential wall of the through-bore.

In the embodiment shown in FIG. 4, these through-bores are a cylinder intake duct 37, a cylinder outlet duct 38, the intake duct 13 already described in combination with FIG. 1, a flushing duct 39, and a ventilation duct 40. The cylinder intake duct 37 and the cylinder outlet duct 38 are provided as separate ducts in this embodiment. However, it is also possible to combine these two ducts if the valve slide element 35 (FIG. 5) is designed appropriately, as has been done in the embodiment according to FIG. 1.

Figure 6:
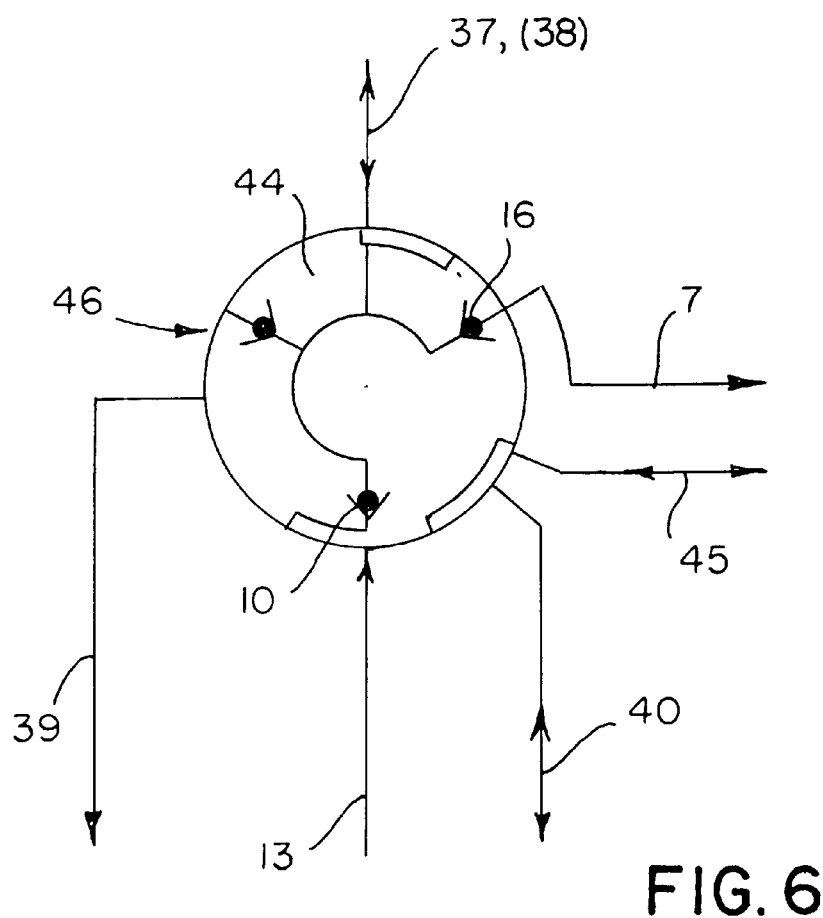
FIG. 6 is a functional sketch for describing the switching functions of the outlet device according to FIG. 5.
Figure 14:
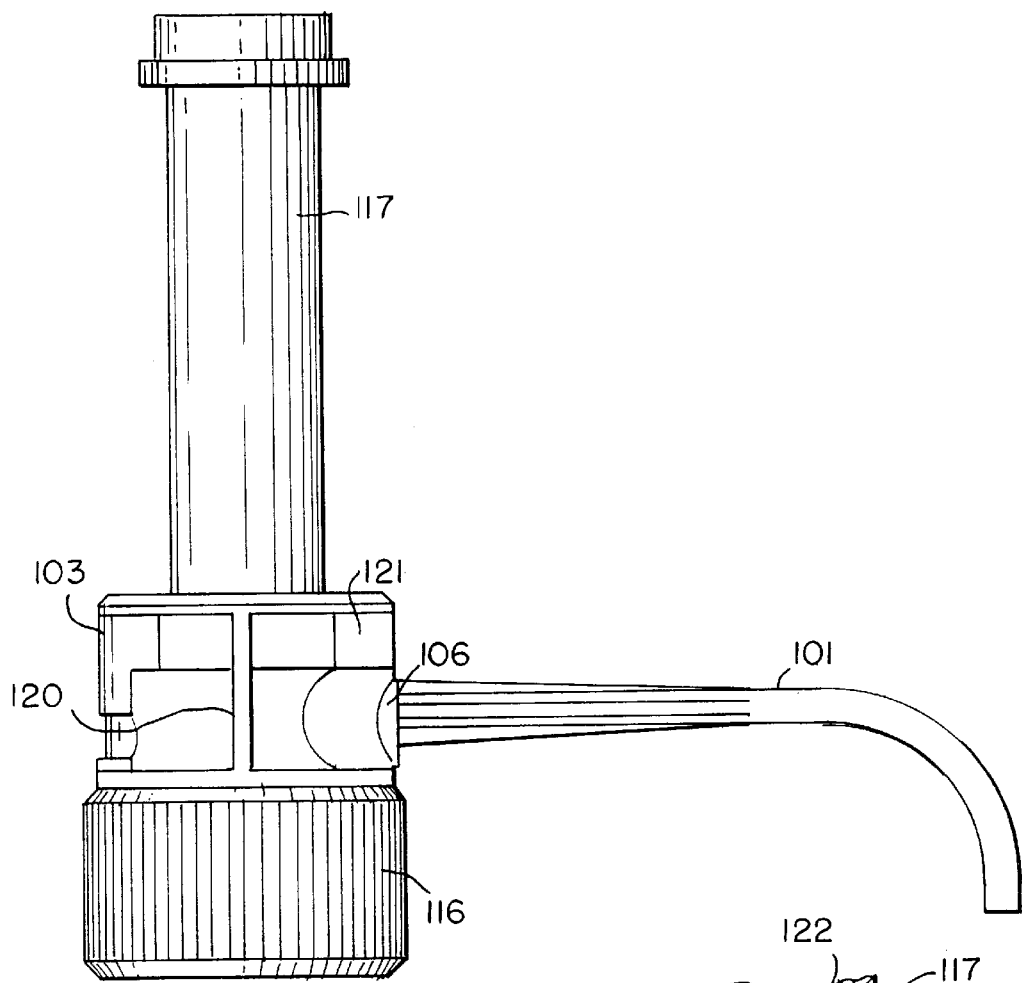
FIG. 14 shows a valve block having a receiver conduit, adapter sleeve, and an integral protective tube of the supply unit of a liquid dispenser, wherein a glass or ceramic cylinder as a supply and dosing cylinder of the supply unit of the liquid dispenser preferably encompasses the protective tube.
Figure 16:
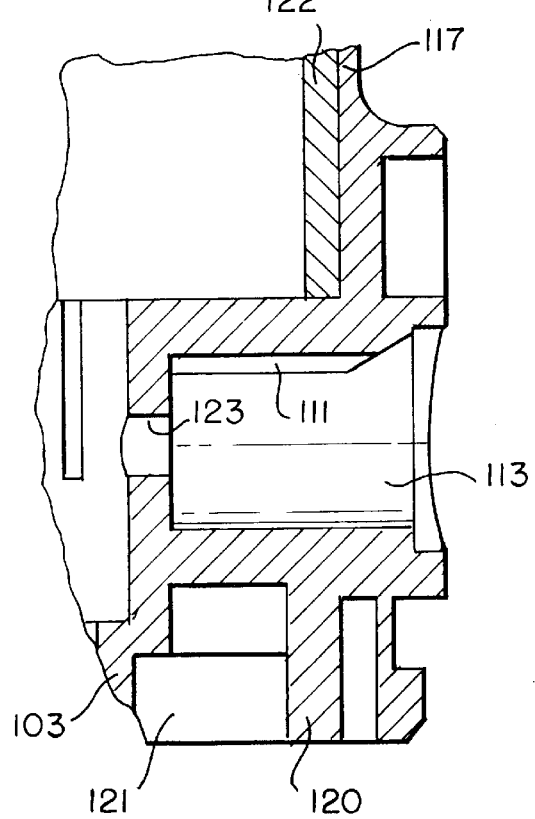
FIG. 16 is a sectional view in the area of the receiving opening of the valve block.
Figure 15:
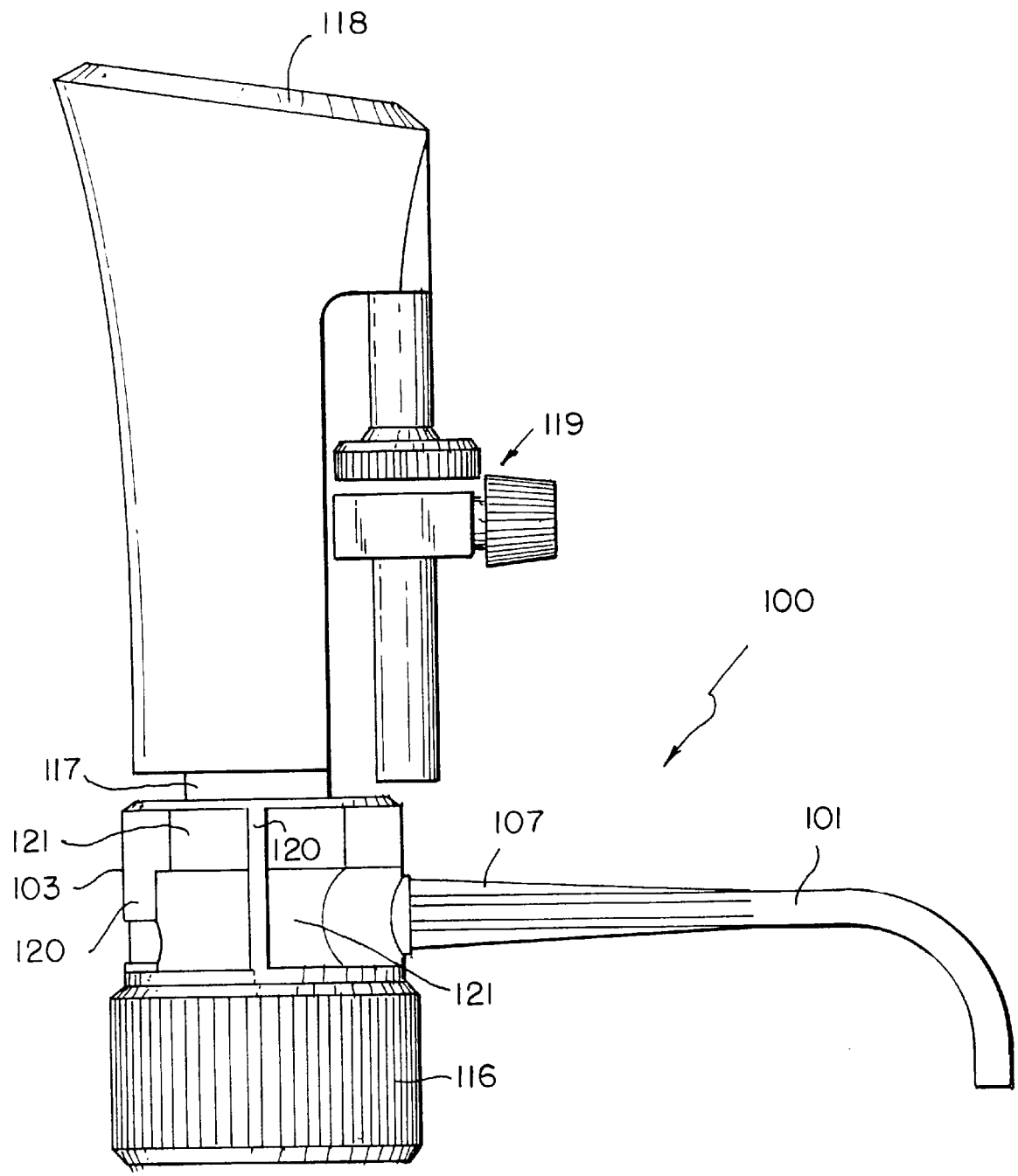
FIG. 15 shows a liquid dispenser with the receiver conduit according to FIG. 10 in a lateral view.

Referring now to FIG. 6, the ducts 37, 38, 39, 40, and 13 may be brought to an opening or closing position by operating the valve slide element 35. The flushing duct 39 is provided, in particular when taking the liquid dispenser into operation for the first time, or in case of a longer period of nonuse of the dispenser, to return the fluid supplied by the supply and closing cylinder back to the vessel, until air bubbles are no longer generated in the intake hose or in the supply and dosing cylinder.

According to a preferred embodiment of the invention, the flushing duct 39 opens into an annular space surrounding the hose pin 14. It is then possible in an advantageous manner that the fluid returned by the flushing duct flows back into the vessel on the outer wall of the hose put onto the hose pin 14 without splashing onto the wall of the vessel. According to a preferred embodiment of the invention, a cylinder pin 41 extending coaxially to the hose pin 14 is provided to form this annular space according to FIG. 4. This cylinder pin 41 on one hand enables a regular bypass flow of the intake hose (not shown) and, on the other hand, it prevents the ventilation duct 40 from contacting the fluid returned. The inner wall of the recess 36 forms a smooth surface. According to a preferred embodiment of the invention, the recess 36 can also be slightly conical, which leads to an extremely reliable seal between the valve slide element 35 and the inner wall of the recess 36.

In the embodiment shown in FIG. 4, the valve slide element 35 is fixed in the valve body 1 by means of a bayonet socket. This bayonet socket comprises a lock-in projection formed at the valve body 1. To enable effective cleaning of the dispenser and effective sterilization of the liquid dispenser, the entire valve and switching mechanism can be removed from the valve block in a simple manner, preferably without the aid of a tool. For this purpose, the recess 36 provided for accommodating the valve slide element 35 is accessible from the outside. The relatively large recess 36 furthermore enables effective access of a cleaning or sterilization agent to the inner space formed in the supply and dosing cylinder.

If necessary, the valve body 1 is provided with a plug device, by means of which the valve slide element 35 removed from the recess 3 can be attached to the valve body 1 or the liquid dispenser in an upright position. A switching lug 43 (FIG. 5), integrally formed with the valve slide element 35, preferably serves as an attachment section. This switching lug 43 may be inserted into a groove formed at the valve block 1, so that it becomes possible to also put the disassembled liquid dispenser as a combined unit into a sterilization device without the individual parts of the liquid dispenser lying loosely in the sterilizer or being mixed-up.

The valve mechanism provided in the valve block 1 described in combination with FIG. 4 may also be used in a liquid dispenser, in which the valve block 1 and the supply and dosing cylinder 3 do not form an integral unit. It is also possible to insert an insertion element into the recess 36 provided in the valve block instead of the valve slide element 35, wherein the insertion element has. for example, just two check valves and does not allow any other switching operation between a flushing mode, a supply mode, and a blocking position. Such an insertion element is provided in a base version of the dispenser and can be perfectly exchanged with a valve slide element 35 that is designed accordingly. The valve block 1 and the supply and dosing cylinder 3 then form a supply module, the special operational properties of which are defined by the use of an appropriate valve slide element 35 or an appropriate insertion element. The described embodiment of the valve block can also be used according to a preferred embodiment of the invention without an insertion cylinder.

The valve slide element 35 shown in FIG. 5 is pivotally inserted into the recess 36 of the valve block. The maximum pivot range of the valve slide element 35 is defined by a stopper. This stopper is formed by a bayonet socket means, which at the same time fixes the valve slide element 35 in the axial direction. The valve slide element 35 comprises a pin section 44, the circumferential surface of which forms a slide system together with the inner circumferential wall of the recess 36. By pivoting the pin section 44 to certain rotary positions, certain ducts formed in the valve block 1 become effective, i.e., they let liquid through, or become ineffective, i.e., closed.

According to a special aspect of the present invention, it is possible by the valve mechanism to also block the vessel ventilation. If extremely volatile supply media are used, it is thereby avoided that vapor formed in the interior of the vessel escape from the vessel. The ventilation of the vessel is active only if the device is switched to a discharge or flushing state.

In order to prevent an undesired high pressure being built up in the interior of the vessel, the ventilation mechanism may additionally be provided with an overpressure valve or a comparably small pressure compensation bore. The vessel ventilation means comprises a sintered granulate pin 45 which is inserted into the valve slide element 35.

A number of communication paths are provided in the pin section 44 of the valve slide element 35, the paths being open in a respective switching position of the valve slide element 35.

An embodiment that is of special advantage, not only in view of assembly points of view, but also in view of the capability of sterilization of the liquid dispenser, is provided in that preferably all valves (check valves) are disposed in the valve slide element 35. Three check valves in particular formed by spring-loaded balls are provided in the embodiment shown in FIG. 5 in the interior of the pin section 44. The respective valve seats of these check valves are integrally formed with the valve slide element 35. The discharge tube 7 is also integrally formed with the valve slide element 35. The switching lug provided at the valve slide element 35 on one hand enables an especially ergonomic switching of the valve slide element and on the other hand represents a display by which the respective operating condition of the fluid dispenser can be easily recognized.

The function of a preferred embodiment of the valve slide element 35 will now be described in combination with FIG. 6. The pin section characterized in FIG. 6 by reference number 44, is pivotal clockwise and counterclockwise about 30°. In the position shown, the pin section 44 is an "outlet" position and enables an intake of the fluid over the intake channel 13 shown in a simplified manner as an arrow, as well as over the cylinder intake duct 37. During the intake process, the intake valve ball 10 takes an open position and enables a fluid passage through the check valve, which is shown in a simple manner in this case. When lowering the supply plunger, the fluid is discharged into the cylinder outlet duct 38 wherein the outlet valve ball 16 takes an open position and enables a fluid passage to the outlet duct 7. During the intake of the fluid from the vessel over the intake duct 13, ambient air may flow into the vessel through the sinter granulate pin 45, shown in FIG. 5 as well as through the ventilation duct 40. If excess pressure prevails in the interior of the vessel, a respective amount of gas may also escape from the vessel via passages 40, 45. If the pin section 44 is pivoted about 30° in a counterclockwise direction, the connection between the discharge tube 7 and the cylinder outlet duct 38 is interrupted, and the flushing duct 39 communicates via an additionally provided flushing check valve 46 with the interior of the supply cylinder. It is possible in this switching position to supply a fluid sucked on by the intake duct 13, through the supply and dosing cylinder back to the vessel over the flushing duct 39 by respective pump strokes of the supply plunger.

In the embodiment of the valve shown in FIG. 6, there is communication during flushing between the interior of the vessel and the surroundings through the sinter granulate pin 45.

If the pin section 44 is pivoted from the position shown in FIG. 6 about an angle of 30° in clockwise direction, the pin section blocks the intake duct 37, the outlet duct 38, the discharge tube 7, preferably also the ventilation duct 40, the intake duct 13, and if necessary also the flushing duct 39. In this manner an undesired escape of the fluid or of vapor formed by the fluid is prevented. Moreover, it is ensured that in case the supply and dosing cylinder breaks or is separated from the valve block 1, the vessel can still safely be locked. Regarding FIG. 6, it has to be noted that the fluid paths are shown schematically only and according to a preferred embodiment of the invention do not extend at one level. The check valves that are shown in this example are arranged in the interior of the pin section in a manner that the individual closing balls are movable radially to the longitudinal axis of the pin section 44. According to an alternative embodiment of the invention, three longitudinal bores parallel to one another and parallel to the longitudinal axis of the pin section are provided in the pin section, the valve balls being accommodated in the longitudinal bores in a manner that these balls are movable in the longitudinal direction of the pin section 44. Appropriate valve springs are also inserted in these longitudinal bores.

According to a preferred embodiment of the invention, the recess 36 is formed by a glass or ceramic sleeve that is injected or formed into the valve body 1. This will permit smooth movement of the valve slide body 35.

Instead of providing the above-mentioned embodiment of the valve slide element 35 as a rotary slide valve, it is also possible in accordance with an alternative embodiment of the invention, to bring this valve slide element to different switching positions by movement along its longitudinal axis. According to another embodiment of the invention, a through-bore is provided at the valve slide element 35, with a lock, in particular the shackle of a padlock, being engageable with the through-bore, whereby unauthorized removal of liquid from the vessel can be prevented. Since the valve slide element 35 also blocks the fluid communication between the discharge tube 7 and the vessel, fluid cannot be sucked out of the vessel if the valve slide element 35 is in a blocking position.

Since the ventilation of the vessel is also blocked in the closing position of the valve slide element 35, neither gas nor vapor can escape from the vessel nor can an exchange of particles with the surroundings take place.

According to a further aspect of the present invention, the valve slide element 35 is constructed in such a manner that this element can be brought to a switching position in which the pump unit comprising the supply and dosing cylinder 3 and the supply plunger 4 can also be used for sucking in the fluid from an external vessel. According to a preferred embodiment of the invention, a hose pin is formed for this purpose integrally with the valve body 1, wherein a hose leading to the external vessel can be put onto the hose pin.

FIG. 7 shows a further embodiment of the valve block with an integrally formed supply and dosing cylinder 3. The valve block 1 in the embodiment that is shown in this connection is provided in the shape of a cylindrical pin, which is inserted into a counter section complementarily formed in a manner that this pin is pivotal about its longitudinal axis. The cylindrical pin has a fluid intake duct 51 and a fluid discharge duct 50. These two ducts may be brought into fluid communication in accordance with the pivot position of the supply and dosing cylinder with the appropriate fluid ducts in the counterpart. The pivot movement of the supply and dosing cylinder 3 is facilitated by an operating section 52. The current switching position of the supply and dosing cylinder 3 may be displayed, according to a preferred embodiment of the invention, by a display nose 53.

An insert cylinder is not provided in the embodiment of the valve block with an integrally formed supply and dosing cylinder 3, that is shown in this connection, but the valve block as well as the supply and dosing cylinder 3 are formed of a high-quality plastic material that is resistant to chemicals.

In the embodiment according to FIG. 8, the valve block is integrally formed with the supply and dosing cylinder 3. The discharge tube 7 in the embodiment that is shown in this connection is also integrally formed with the valve body 1. A central axis of the discharge tube 7 extends first of all in a straight line in the embodiment shown in this connection. According to a preferred embodiment of the invention, the discharge tube is bent in the course of a subsequent shaping step. The discharge tube 7 is formed by molding a preferably cylindrical, straight-line mold core in the interior of a preferably also cylindrical mold cavity. As an alternative, it is also possible to form the discharge tube 7 by molding a core with a preferably cylindrical cross-section, the longitudinal axis of which, in particular. extends in the shape of an arc of a circle. According to a preferred embodiment of the invention, a valve seat mold section is provided at an end facing the longitudinal axis of the supply and dosing cylinder, the end defining the inner wall of the discharge tube, for forming a valve seat (59) in the interior of the valve block. In the embodiment according to FIG. 8, the valve block 1, as well as in the embodiment according to FIG. 1, is also provided in a skeleton structure. In this case, the valve block 1 has a number of webs or flutes 9, which reinforce the entire valve block 1. The valve block comprises a bottom recess 54 formed substantially coaxially to the hose pin 14, the bottom recess extending at least section-wise almost fully to the interior space defined in the supply and dosing cylinder 3. On a side facing away from the discharge tube 7, the valve block is also provided with a recess 55, which is separated from the bottom recess 54 by a comparatively thinner wall section.

In the embodiment according to FIG. 8, the valve block is screwed onto a supply block 57 by a swivel nut 56 which is shown schematically in this connection, the supply block being attached to a motor-operated laboratory dosing device. The supply block is provided with an intake duct section 58 by means of which a medium to be dosed can be sucked in from a vessel. According to a preferred embodiment of the invention, the supply block 57 is also provided with a duct through which a fluid, which is first of all sucked in through the supply and dosing cylinder means, can be supplied back into the vessel, in particular for ventilating the supply.

The supply plunger, which is not shown in this connection and which is provided in the supply and dosing cylinder, is coupled with a drive mechanism and is driven alternately by the aid of an electronic control device. According to a preferred embodiment of the invention, a seal device is provided in the supply block in order to create a secure seal between the supply block 57 and the pin 14 originally provided as a hose pin. According to a preferred embodiment of the invention, the circumferential surface of the pin 14 is slightly conical and can be brought into sealing engagement with a conical bore formed complementarily in the supply block 57.

A special embodiment of the discharge tube 7 is provided in the precision dosing device according to FIG. 9, the discharge tube having a press-in section 63 which is pressed into the valve body 1. The press-in section 63 is provided with a number of sealing blades, which enable a secure seal between the press-in section 63 and the valve body 1 and a tight seat of the discharge tube 7 in the valve body 1. The attachment of the discharge tube 7 at the valve body 1 by means of the press-in section 63 enables an especially position-precise attachment of the discharge tube 7 at the valve block 1.

The discharge tube 7 comprises a number of webs or flutes 60 by means of which the discharge tube 7, in particular in its area facing the press-in section 63, is effectively reinforced. The webs are formed integrally with the discharge tube 7. The discharge tube 7 is manufactured by a plastic injection molding process.

An outlet opening of the discharge tube 7 can be closed by means of a closing cap 62. The closing cap 62 is connected to the discharge tube through a holding strap 61. According to a preferred embodiment of the invention, the closing cap 62 and the holding strap 61 are formed integrally with the discharge tube 7.

The web 60 of the discharge tube 7, as well as the webs formed at the valve block 1, are arranged in a cross-like manner in the embodiment shown in this connection. Through this, an especially effective reinforcement of these members and a favorable demolding of the discharge tube 7 or of the valve block 1 from the respective form tool is possible.

The embodiment of the discharge tube 7 shown in this connection may be attached for example by means of a bayonet socket at the valve block 1, or, as shown in the embodiment of FIG. 7, it may be formed integrally with the valve block 1.

The invention is not restricted to the embodiments described above. It is also possible for example to form an attachment device, which is provided for connecting the valve block 1 to a vessel, integrally with the valve block 1. Furthermore, it is also possible to use duroplastic molding material for forming the integral unit instead of a plastic material injected in the course of a hot channel injection process.

Although it is preferred to use a glass cylinder as a supply and dosing cylinder 3, which is encompassed by a polypropylene protective tube 8 (integral with the valve block), with a glass plunger as a dosing and supply plunger (if needed with a PTFE coating, which preferably allows the formation of at least one sealing lip) sliding in this glass cylinder, the integral dosing unit can also be formed as a ceramic cylinder or an integral plastic member in the area of the cylinder wall (along which the supply plunger slides). In such a case, stabilization of the plastic material is advantageous for a precise dose, preferably by doping with a particulate material stabilizing the plastic material in the plastic melt (or as a subsequent or quenching film-forming lamination) with a mineral, ceramic metal, or metal oxide powder material, such as glass dust or ceramic dust, i.e., $Al_2O_3$ or $TiO_2$.

FIG. 10 shows an embodiment of the discharge tube 101, which comprises an end section 102 for attaching the same in a press-fit at the valve block 103 of the liquid dispenser. At the side of its discharge, the discharge tube 101 comprises a discharge section which is bent in the usual manner vertically downwards, which can also be closed by a closing cap, which is set onto the discharge tube 101 (see FIG. 9).

The end section 10 is limited by a radial flange 10, which at the same time shown the inset length of the intake tube 101 in the valve block 103 shown in FIG. 4.

Reinforcing ribs 107 reducing in height and starting at the radial flange 106 are formed integrally along the discharge tube 101. These ribs reinforce the discharge tube 101.

The end section 102 comprises a plurality of axially spaced radial ribs 104 as well as an inset end section 109, the radial dimension of which is matched with an inner diameter of an accommodation opening 110 in a valve block (see FIG. 16) in a manner that a press seat is established between the end section and the accommodation opening of the valve block 103 and the discharge tube 101 is captively pressed into and held in the valve block 103.

The radial projections 104 at the end section 102 of the discharge tube 101 may therefore engage respective radially inwardly projecting counter projections of the accommodation opening 110 of the valve block 103 or with different latches such as latch recesses or bayonet socket latches.

The accommodation opening 110 of the valve block 103 (see FIG. 16) comprises a wedge-shaped inwardly projecting positioning projection 111, which engages a respective counter recess in the area of the end section 102 of the discharge tube 101 to ensure a circumferential position of the discharge tube 101 at the valve block 3 and to determine the inset position of the discharge tube 101 when pressed into the accommodation opening 10 of the valve block 103.

An accommodation chamber 113 is formed in the end section 102 of the discharge tube 101 for accommodating a valve body 114 of a pressure valve provided in the valve block 103. The valve body is a glass or ceramic ball 114, which is held in the accommodation change by three guide projections 108 each arranged offset about 120° and positioned with axial possibilities of movement. In FIG. 12, the valve ball 114 is shown left outside the accommodation chamber 113. The valve elucidates its insertion direction.

A section 113c of the accommodation chamber 113 reduced in diameter is provided for receiving a preloading spring 115, in particular a metal spring, which preloads the valve ball 114 against the valve seat 123, which is pressed-in either integrally or separately, provided in the valve block 103.

If FIG. 13, the valve block 103 is shown with a discharge tube 101 inserted therein. At the lower end the valve block 103 has an adapter sleeve 116 in an annular groove, which is provided with an internal thread and which is provided for screwing the valve block 103 onto a vessel containing a fluid to be dispensed.

According to a preferred embodiment of the invention, the valve block 103 is formed integrally with a protective tube 117, as can be seen from FIG. 5, at the same time it is encompassed by a glass cylinder 122, which forms a supply and dosing cylinder of a liquid dispenser. A glass plunger or a supply plunger which is at least partially coated and if needed provided with a sealing lip is slidably received in the supply and dosing cylinder, connected with a manual operating device such as handle 118 for moving upwards or pressing down the supply plunger. The entire liquid dispenser 100, including a supply stroke adjustment device 119, is shown in FIG. 6. This liquid dispenser 100 can thus be composed of a minimum amount of single parts, wherein the discharge tube 101 is pressed into the valve block 103 with a press seat and sophisticated screw connections are avoided. Such a liquid dispenser 100 is not suitable for permanent use for dispensing solvents.

The valve block 103 comprises polypropylene or a different material resistant to chemicals, as well as the protective tube integrally encompassing the glass cylinder 122. The same applies for the discharge tube 101 and the adapter 118.

The valve block 103 has a skeleton structure with enforcement ribs 20 and interposed 121 hollow spaces.

Instead of a manual operation by the handle 118, a motive operation of the supply and dosing plunger can also be provided. In connection herewith (but also in case of a manual operation), a contactless path measuring device, in particular an electric or electronic, electro-optical, optical or magnetic or infrared measuring device, connected with an electronic display may be provided.

What is claimed is:

1. A liquid dispenser, comprising
   (a) a synthetic plastic valve block for connection with a liquid reservoir, said valve block including an integral protective tube;
   (b) an intake valve connected with said valve block;
   (c) a discharge device connected with said valve block;
   (d) a supply and dosing cylinder formed of one of a glass, ceramic, and synthetic plastic material arranged within said protective tube and communicating with said intake valve;
   (e) a supply and dosing plunger slidably arranged within said cylinder; and
   (f) means for reciprocating said plunger within said cylinder to draw liquid from the reservoir into said cylinder and to dispense liquid from said cylinder via said discharge device.

2. A liquid dispenser as defined in claim 1, wherein said supply and dosing plunger is formed of glass and includes means on a portion of the exterior thereof for sealing with the interior of said cylinder.

3. A liquid dispenser as defined in claim 1, wherein said valve block and protective tube are formed of transparent material.

4. A liquid dispenser as defined in claim 1, wherein said supply and dosing cylinder is formed of a synthetic plastic material and includes a stabilizing particulate material comprising one of a mineral, ceramic, metal, metal oxide powder, glass, $Al_2O_3$, and $TiO_2$ material.

5. A liquid dispenser as defined in claim 1, wherein said supply and dosing cylinder is provided with a seal.

6. A liquid dispenser as defined in claim 1, and further comprising means for measuring and displaying a liquid quantity is connected with said supply and dosing cylinder.

7. A liquid dispenser as defined in claim 1, wherein said protective tube comprises an elongation section protruding over said supply and dosing cylinder in the axial direction, said elongation section forming a guide section for guiding said supply and dosing plunger.

8. A liquid dispenser as defined in claim 1, wherein said supply and dosing cylinder is injected into said protective tube.

9. A liquid dispenser as defined in claim 8, wherein a portion of said valve block has a skeletal structure comprising a plurality of spaced flutes.

10. A liquid dispenser as defined in claim 1, wherein the thickness of a wall of said protective tube is at least 10% of the wall thickness of said supply and dosing cylinder.

11. A liquid dispenser as defined in claim 10, wherein said protective tube has a wall thickness of 1 mm and said supply and dosing cylinder has a wall thickness of 2.5 mm.

12. A liquid dispenser as defined in claim 1, wherein said protective tube defines an upper end abutment at the side of said valve block.

13. A liquid dispenser as defined in claim 12, wherein a hollow-cylindrical handle is connected with the supply and dosing plunger, said handle covering said protective tube in a lower end position of the supply and dosing cylinder and having a supply stroke adjustment device cooperating with said upper end abutment.

14. A liquid dispenser as defined in claim 1, wherein a front wall section of said supply and dosing cylinder is integrally formed with said protective tube.

15. A liquid dispenser as defined in claim 14, wherein said front wall section defines a through opening in fluid communication with an inner chamber of said supply and dosing cylinder and with the intake valve.

16. A liquid dispenser as defined in claim 1, wherein said discharge device includes a discharge tube arranged in a press seat within said valve block.

17. A liquid dispenser as defined in claim 16, wherein said discharge tube contains a chamber at an end adjacent to the side of said valve block for receiving a pressure valve.

18. A liquid dispenser as defined in claim 17, and further comprising preloading means arranged in said chamber for preloading said pressure valve against a valve seat.

* * * * *